Patented Aug. 5, 1941

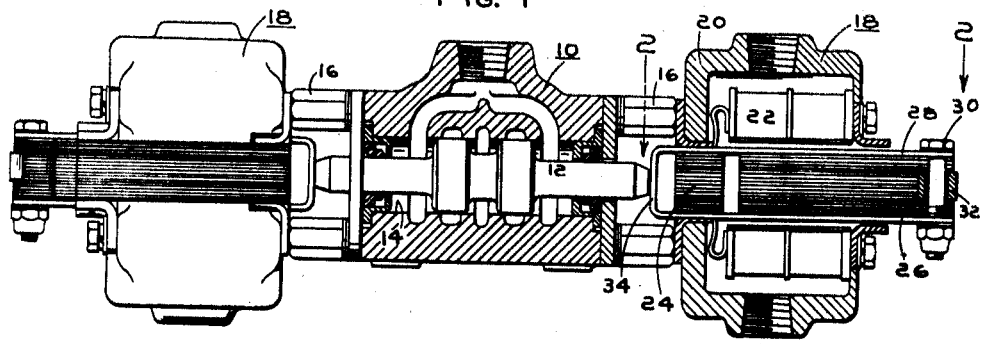
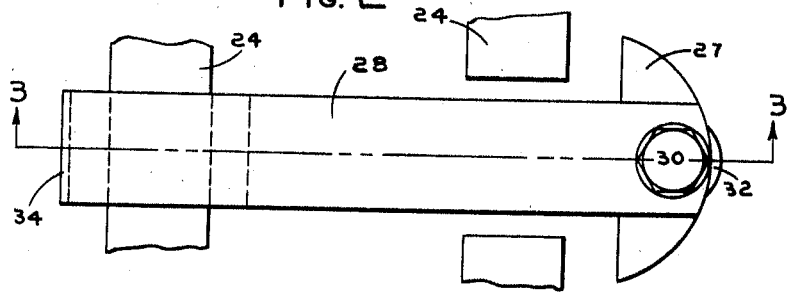
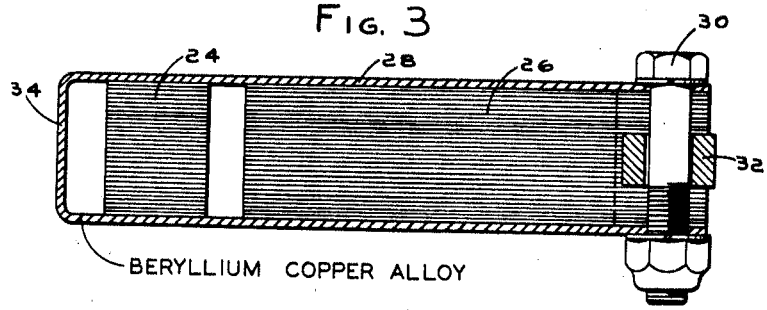

2,251,750

UNITED STATES PATENT OFFICE 2,251,750

PUSHER-TYPE ELECTROMAGNET

Raymond S. Miller, Detroit, Mich., assignor to Vickers Incorporated, Detroit, Mich., a corporation of Michigan Application March 6, 1939, Serial No. 260,095

1 Claim. (Cl. 175—341)

The present invention concerns electromagnetic solenoid constructions of the class used for shifting a movable element to be controlled between two or more positions. Solenoids of this class are frequently utilized for operating the valves of a hydraulic power transmission system and are illustrated in the following disclosure as adapted for that use.

Considerable difficulty has been experienced in the past with solenoids of this character due to premature failure of the operating connection between the movable core of the solenoid and the valve spool which it operates. Devices such as a valve spool, and which are very sensitive to misalignment between the spool and the operating connection if the latter be rigid, have heretofore been connected to the solenoid core through linkage permitting wide latitude in misalignment without exerting sidewise forces on the valve spool. It has been found more expedient in the past to so connect the solenoid core to the valve spool that it pushes on the latter when the solenoid is energized rather than the opposite connection where the solenoid core pulls on the valve spool. This is largely due to the impossibility of providing satisfactory connection between the solenoid core and the valve spool for the pull type solenoid. The connecting mechanism between the solenoid core and the valve spool or other operated device is subjected to extremely severe strains and operations which require repeated actuation of the solenoid. The action of the solenoid is extremely rapid and positive and as a consequence exerts rather high impact and vibrational forces on the connecting mechanism.

It is an object of the present invention to provide an improved push bar construction for solenoids of the character described above which will provide a compact and inexpensive connection having a long trouble-free life substantially equal to the life of the solenoid and valve.

Further objects and advantages of the present invention will be apparent from the following description, reference being had to the accompanying drawing wherein a preferred form of the present invention is clearly shown.

In the drawing:

Figure 1 is a longitudinal cross section of a solenoid-operated valve embodying a preferred form of the present invention.

Figure 2 is a fragmentary sectional view taken along the line 2—2 of Figure 1.

Figure 3 is a sectional view of the push bar taken along the line 3—3 of Figure 2.

Referring now to Figure 1, there is illustrated a conventional spool-type four-way valve 10 having a movable spool 12 shiftable in the bore 14 of the valve body. The spool 12 is illustrated in its neutral or mid position and is adapted to be moved either to the right or left to change the port connections in the valve.

At each end of the valve there is mounted by means of spacer screws 16 a solenoid generally designated as 18. The latter comprises a casing 20 within which is mounted a coil 22 and a stationary field core 24. The latter is formed in the shape of a rather square C as is well known in the art. Slidably mounted within the coil 22 is a movable armature core 26 having a T-shaped head 27 as seen in Figure 2. The cores 24 and 26 are formed of iron laminations. When the coil 22 is energized from a suitable source of current, not shown, the armature 26 is attracted to the left thus closing the gaps in the magnetic circuit as is well known in the art.

For the purpose of connecting the armature 26 to operate the spool 12 there is provided a push bar construction comprising a strap 28 of non-magnetic, high-strength, fatigue-resistant material such as beryllium copper alloy. The strap 28 is bent into the form of a U, the right-hand ends of which are secured to the right-hand end of the armature 26 by a through bolt 30. Preferably a portion of the laminations in the center of the armature have a cut-out portion to provide room for a solid spacer washer 32, thus reducing the number of laminations in compression by the bolt 30. This construction greatly reduces the danger of loosening of the parts at bolt 30 in service.

The strap 28 extends beyond the left-hand end of the armature 26 and through the casing 20 into the space between the same and the body of the valve 10. The legs of strap 28 are freely slidable in the space between the field core 24 and the casing 20. At its left-hand end the strap 28 has a perpendicular portion 34 forming a push plate abutting the projecting end of the spool 12.

It will be seen that the construction described provides a one-piece push bar which is of uniform cross section throughout on which the high stresses of impact imparted by the solenoid are evenly distributed throughout the cross section thereof. Preferably the bends adjacent the push plate portion 34 are of some substantial radius to avoid concentration of stresses at these corners. By constructing the strap 28 of a beryllium copper alloy, the same is non-magnetic and provides high fatigue resisting qualities. As an example of a suitable alloy for this use a composition of 2 to 2½ per cent beryllium and ¼ to ½ per cent nickel with the balance copper is suitable. As this material when rolled into strip is considerably work-hardened, it is preferred to anneal the metal before bending and after bending to harden it to a Rockwell "G" hardness in the range from 50 to 90 as by heating it at 250 to 275 degrees centigrade for two hours and then cooling it.

The present construction has been found in life tests to have several times the satisfactory operating life of any previously available constructions for the same class of service. Solenoids embodying the present construction have successfully withstood two million repeated strokes comprising a forward and reverse movement of the solenoid core whereas the best previously available constructions fail after less than a hundred thousand such strokes.

While the form of embodiment of the invention as herein disclosed constitutes a preferred form, it is to be understood that other forms might be adopted, all coming within the scope of the claim which follows.

What is claimed is as follows:

A push bar construction for a solenoid having a stationary field core and an armature translatable along the solenoid axis toward the field core when the solenoid is energized, said armature comprising a laminated core and a load-operating connection consisting of a one-piece, U-shaped, fatigue-resisting, non-magnetic strap of beryllium copper, said strap being bent from flat stock and having the legs of the U embracing two opposite sides of the laminated core and having the ends of the legs secured thereto, the opposite ends of the legs extending across the field core and united by a flat portion intermediate the legs of the U and perpendicular thereto, said flat portion forming an impact-receiving pusher face on the side of the field core opposite the armature for operating a load.

RAYMOND S. MILLER.